(12) United States Patent
Von Hoyningen-Huene et al.

(10) Patent No.: US 11,382,047 B2
(45) Date of Patent: Jul. 5, 2022

(54) TERMINAL DEVICE, METHOD OF OPERATING A TERMINAL DEVICE, INDUSTRIAL MACHINE, AND METHOD OF SETTING UP AN INDUSTRIAL MACHINE

(71) Applicant: Robert Bosch GmbH, Stuttgart (DE)

(72) Inventors: Johannes Von Hoyningen-Huene, Sindelfingen (DE); Monique Duengen, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/865,235

(22) Filed: May 1, 2020

(65) Prior Publication Data

US 2020/0359335 A1   Nov. 12, 2020

(30) Foreign Application Priority Data

May 6, 2019   (DE) .................... 10 2019 206 467.1

(51) Int. Cl.
*H04W 52/28*   (2009.01)
(52) U.S. Cl.
CPC ................................ *H04W 52/283* (2013.01)
(58) Field of Classification Search
CPC ........................... H04W 52/283; H04W 52/50
USPC ................ 455/69, 522, 456.1, 230; 370/311; 439/76.1
See application file for complete search history.

(56) References Cited

U.S. PATENT DOCUMENTS

| | | | | |
|---|---|---|---|---|
| 5,404,376 A | * | 4/1995 | Dent | H04W 64/00 375/138 |
| 5,487,180 A | * | 1/1996 | Ohtake | H04W 52/50 455/69 |
| 2001/0033558 A1 | * | 10/2001 | Matsuki | H04W 52/287 370/335 |
| 2006/0234526 A1 | * | 10/2006 | Garrels | G05B 19/41855 439/76.1 |
| 2007/0030838 A1 | * | 2/2007 | Kaikkonen | H04W 52/325 370/342 |
| 2009/0325625 A1 | * | 12/2009 | Hugl | H04W 52/244 455/522 |
| 2010/0142425 A1 | * | 6/2010 | Lee | H04W 52/54 370/311 |
| 2011/0159832 A1 | * | 6/2011 | Yamagajo | H01Q 5/335 455/230 |

(Continued)

FOREIGN PATENT DOCUMENTS

| | | |
|---|---|---|
| DE | 102005017712 | 12/2006 |
| EP | 2750457 | 7/2014 |
| GB | 2426665 | 11/2006 |

*Primary Examiner* — Tan H Trinh
(74) *Attorney, Agent, or Firm* — Michael Best & Friedrich LLP

(57) ABSTRACT

A terminal device (200) is provided for a sensor (S) and/or actuator (A) of an industrial machine, wherein the terminal device (200) comprises at least one communication module (C) and an antenna (A), and wherein the terminal device (200) is set up to determine an initial transmission power as a function of a previously determined relative position of the terminal device (200) to at least one master unit and/or as a function of a previously determined estimated value for the transmission power, and to transmit a radio signal with the determined initial transmission power via an uplink radio channel.

14 Claims, 2 Drawing Sheets

(56) References Cited

U.S. PATENT DOCUMENTS

| | | | | |
|---|---|---|---|---|
| 2014/0094214 A1* | 4/2014 | Meyer | ........... | H04W 52/242 |
| | | | | 455/522 |
| 2015/0346316 A1* | 12/2015 | Cheng | ........... | G01S 11/06 |
| | | | | 455/456.1 |
| 2016/0246357 A1* | 8/2016 | Taylor | ........... | G06F 1/325 |
| 2017/0215078 A1* | 7/2017 | Mochizuki | ........... | H04W 72/04 |
| 2017/0272316 A1* | 9/2017 | Johnson | ........... | G06Q 10/103 |
| 2018/0263053 A1* | 9/2018 | Moon | ........... | H04W 74/0833 |
| 2018/0295645 A1* | 10/2018 | Yaver | ........... | H04W 72/14 |
| 2018/0324768 A1* | 11/2018 | Shaheen | ........... | H04L 5/0092 |
| 2019/0082396 A1* | 3/2019 | Maheshwari | ........... | H04W 52/247 |
| 2019/0132849 A1* | 5/2019 | Morioka | ........... | H04W 72/042 |
| 2019/0364492 A1* | 11/2019 | Azizi | ........... | H04W 48/16 |
| 2020/0205202 A1* | 6/2020 | Takahashi | ........... | H04B 7/0695 |
| 2020/0336990 A1* | 10/2020 | Chen | ........... | H04L 5/0048 |
| 2020/0348662 A1* | 11/2020 | Cella | ........... | G05B 23/0229 |
| 2021/0144756 A1* | 5/2021 | Wang | ........... | H04W 52/42 |
| 2021/0168736 A1* | 6/2021 | Cho | ........... | H04W 52/225 |
| 2021/0296758 A1* | 9/2021 | Kim | ........... | H04B 1/38 |

\* cited by examiner

TERMINAL DEVICE, METHOD OF OPERATING A TERMINAL DEVICE, INDUSTRIAL MACHINE, AND METHOD OF SETTING UP AN INDUSTRIAL MACHINE

BACKGROUND OF THE INVENTION

The invention concerns a terminal device, a method of operating a terminal device, an industrial machine, and a method of setting up an industrial machine.

In the field of industrial machines, it is known that the individual sensors, actuators and control units are wired together.

SUMMARY OF THE INVENTION

According to a first aspect of this description, a terminal device is provided for a sensor and/or actuator of an industrial machine, wherein the terminal device comprises at least one communication module and an antenna, and wherein the terminal device is set up to determine an initial transmission power as a function of a previously determined relative position of the terminal device to at least one master unit and/or as a function of a previously determined estimated value for the transmission power, and to transmit a radio signal with the determined initial transmission power via an uplink radio channel.

Determining the relative position or the estimated value initially means additional work in setting up the industrial machine, but it reduces the communication overhead during operation of the communication network. In particular, a complex initialization phase for the transmission power can be omitted, making communication with the terminal device available more quickly. In addition, hardware and/or software required for adjusting the transmission power can be omitted, which makes the terminal device more cost-effective to develop and manufacture.

As a further advantage, the cabling effort of the industrial machine is considerably reduced. Only the power supply of the terminal device must be provided.

An advantageous example is characterized in that the terminal device is set up to determine a relative actual position of the terminal device to the at least one master unit, to determine a further transmission power as a function of the determined relative actual position of the terminal device to the at least one master unit and/or as a function of a previously determined estimated value for the transmission power at the determined relative actual position, and to transmit a further radio signal with the determined further transmission power via the uplink channel.

It is also advantageous to adjust the further transmission power as a function of the relative actual position if the terminal device is moved.

An advantageous example is characterized by the fact that the terminal device is set up to determine the further transmission power as a function of a previously determined item of environment information between the relative actual position and the position of the master unit.

By taking into account the previously determined environment information, it is possible to consider the previously known geometries, dimensions, materials of the industrial machine.

An advantageous example is characterized by the fact that the terminal device is set up to receive data from the sensor and/or the actuator and to transmit the received data by means of the radio signal and/or the further radio signal.

Another aspect of this description concerns a method of operating a terminal device for a sensor and/or actuator of an industrial machine, the method comprising: determining an initial transmission power as a function of a previously determined relative position of the terminal device to at least one master unit and/or as a function of a previously determined estimated value for the transmission power, and transmitting a radio signal with the determined initial transmission power via an uplink radio channel.

Another aspect of this description concerns an industrial machine comprising a plurality of terminal devices according to one of the aspects described above and the at least one master unit with which the plurality of terminal devices communicate wirelessly.

Another aspect of this description concerns a method of setting up the industrial machine, the method comprising: determining the position of the at least one master unit with which the plurality of terminal devices are to communicate wirelessly, determining the respective relative positions of the plurality of terminal devices to the master unit, providing data for the respective terminal device with the assigned relative position and/or with the estimated values for the transmission power, and arranging the terminal devices provided with data at the assigned relative position.

The previously determined relative positions or estimated values are only made possible by a fixed configuration of the industrial machine within certain limits. Consequently, the information about the fixed configuration of the industrial machine can be used to reduce communication overhead for setting the transmission power.

An advantageous example is characterized by the fact that the method of setting up the industrial machine includes: determination of an item of environment information between respective positions of the terminal devices and the position of the master unit, and provision of data for the respective terminal device with the environment information and/or with the estimated values for the transmission power.

By providing the environment information or the corresponding estimated values, a three-dimensional transmission power map is provided for the terminal devices, adapted to the position of the master unit in relation to the industrial machine.

DETAILED DESCRIPTION

Figure 1:
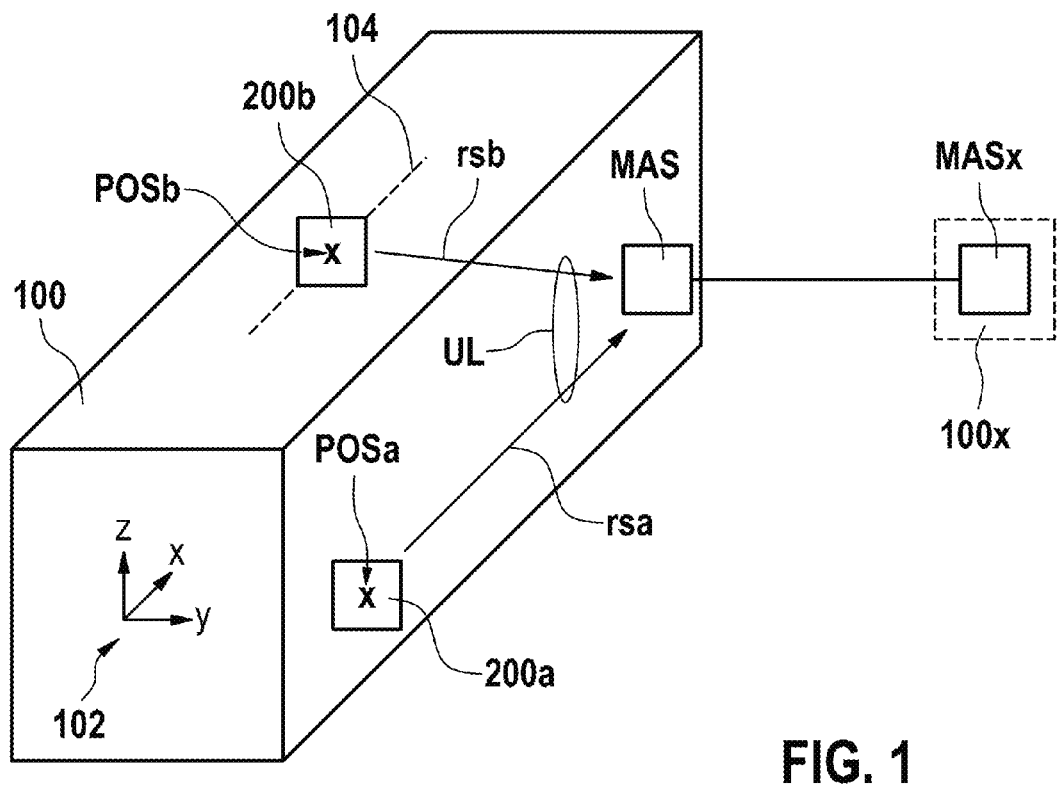
FIG. 1 shows an industrial machine in schematic form.

FIG. 1 shows an industrial machine 100 in schematic form. The industrial machine 100 comprises a plurality of terminal devices 200a, 200b and at least one master unit MAS, with which the plurality of terminal devices 200a, 200b communicate wirelessly. The master unit MAS is connected to another master unit MASx of another industrial machine 100x.

The terminal devices 200a, 200b are connected to a sensor and/or actuator and are set up to receive radio signals via a downlink channel from the master unit MAS and to send radio signals rsa, rsb via an uplink channel UL to the master unit. The industrial machine 100 is for example a packaging machine, piece processing machine, handling machine or any other machine.

Within an imaginary coordinate system 102 of the industrial machine, the terminal device 200a and the master unit MAS are fixed with respect to each other. The terminal device 200b, on the other hand, moves along an exemplary straight trajectory 104 during operation of the industrial machine 100.

For successful data transmission from the terminal devices 200a, 200b to the master unit MAS in the uplink, power control is provided to keep the received signal power of all terminal devices 200a, 200b at the master unit MAS essentially equal and thus make all outgoing radio signals from the terminal devices 200a, 200b receivable and identifiable by the master unit. This power control is initially determined and continuously adjusted.

The terminal devices 200a, 200b have their own sensors that provide information about their own position, speed and direction of movement. It is also possible that the respective terminal device 200a, 200b also has access to environment information which allows a conclusion to be drawn about the influence of the environment, e.g. objects, on the communication on the uplink channel UL.

Based on position and environment information or even just based on the position, an initial estimate of the required transmission power for the uplink channel UL is made, which is optimized by fine tuning at signal processing level. The adaptation can also be predictive. Advantages are a shorter duration of the power adjustment in the initialization phase, because a more accurate power estimation is already available, as well as in case of mobility or change of the environment and the use of simpler power control at signal processing level. This results in a saving of overhead due to less frequent sending of e.g. test signals and a lower complexity.

Figure 2:
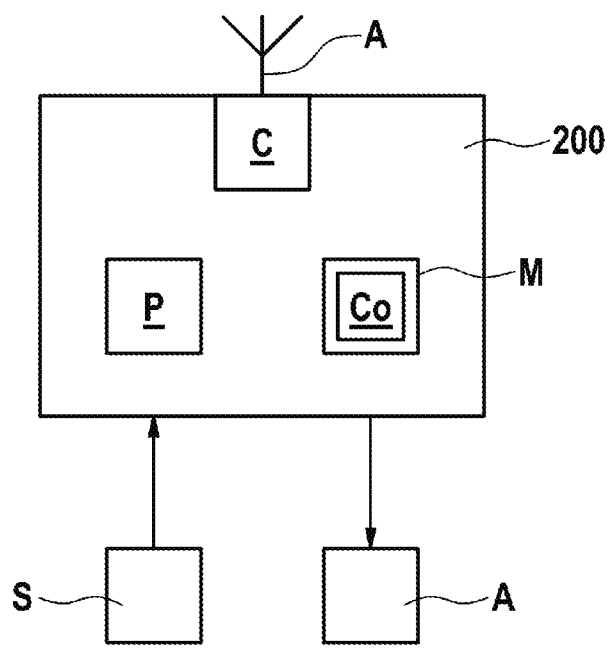
FIG. 2 shows a terminal device in schematic form.

FIG. 2 shows the terminal device 200 in schematic form. The sensor S and/or the actuator A is/are assigned to the terminal device 200. The terminal device 200 comprises at least one communication module C, at least one antenna A, at least one processor P and a memory M with computer program code Co. The computer program Co is configured to perform, together with the processor P, the communication module C and the at least one antenna A, the method steps explained in this description.

Figure 3:
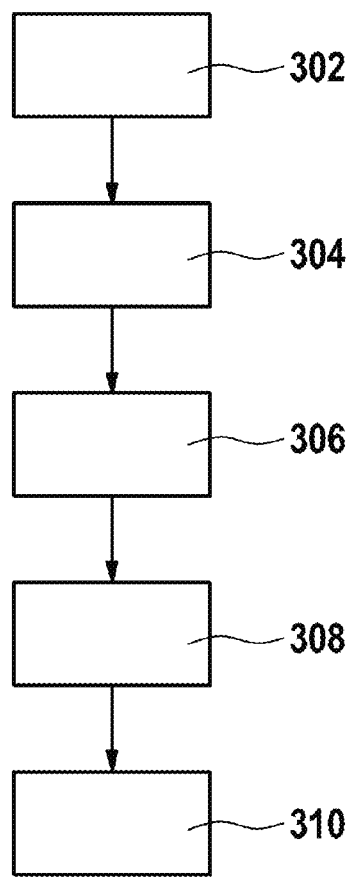
FIG. 3 shows a flow chart for operating the terminal device.

FIG. 3 shows a flow chart for operating the terminal device. In a step 302, an initial transmission power is determined as a function of a previously determined relative position of the terminal device to the at least one master unit and/or as a function of a previously determined estimated value for the transmission power.

In an example of step 302, a three-dimensional map with corresponding estimated values for the transmission power is stored in the memory of the terminal device. With the help of the relative position, which is also stored in the memory of the terminal device, the estimated value can be determined from the stored map.

In another example of step 302, the estimated value is stored as the only estimated value in the memory of the terminal device and is taken directly as the initial transmission power.

The radio signal is transmitted in step 304 with the determined initial transmission power via the uplink radio channel. The radio signal contains, for example, data from the sensor or feedback signals from the actuator to the master unit.

Steps 302 and 304 provide an initialization phase of communication. When a multiple access method such as OFDMA or CDMA is initialized, the terminal device sets its transmission power for the first time so that it does not interfere with radio signals from other terminal devices.

For example, it is intended that for this initialization the relative position of the terminal device is assumed to be constant and the initial transmission power is calculated from the position data and the environment information. Based on the distance between the master unit and the terminal device and the knowledge whether a line-of-sight (LOS) or a non-line-of-sight (NLOS) connection exists between the master and the subscriber, for example based on environment information available on the terminal device, the minimum required transmission power to be assumed as initial transmission power with an additional small margin is determined by means of the path loss formula with corresponding path loss coefficient.

The free space attenuation F can be used as a path loss formula and can be determined for isotropic antennas according to equation 1. Here r is the distance between transmitter and receiver and lambda is the wavelength of the transmitted signal.

$$F=(4PIr/\text{lambda})^2=\text{const}\cdot r^2 \qquad (1).$$

The formula for free space attenuation is a relatively rough estimate. Since equation 1 only squares the distance and has to be multiplied by a constant, there is basically nothing to prevent a calculation on the terminal device. Alternatively, or additionally, equation 2 is given for the so-called Hata model.

$$PL\ [dB]=10*\text{eta}*\log\ 10(d[m])+PL\_\{1m\}+X\_\{SF\} \qquad (2)$$

For this precise knowledge of the channel is required. PL_{1m} is the reference path loss at 1m. X_{SF} describes the variance around the mean path loss and takes shadow fading into account. Of course, more precise calculations are also possible.

The initial determination of the transmission power is completed at the end of step 304. The transmission power is then adjusted during operation of the radio communication network.

In a step 306 a relative actual position of the terminal device to the at least one master unit MAS is determined. This can be done, for example, as a function of signals from an accelerometer assigned to the terminal device.

In a step 308, a further transmission power is determined as a function of the determined relative actual position of the terminal device to the at least one master unit and/or as a function of a previously determined estimated value for the transmission power at the determined relative actual position.

In a development the further transmission power is determined in step 308 as a function of a previously determined item of environment information between the relative actual position and the position of the master unit.

The further radio signal is transmitted with the determined further transmission power via the uplink channel in step 310. The further radio signal includes, for example, data originating from the sensor and/or the actuator.

During ongoing operation and also during a running transmission of data, changes in the transmission power are adapted by a changed position and/or a changed environment. In one example, closed-loop control is carried out, in which the average path power loss, which can be determined at each position from the position, movement and environment information, is also included as influencing values.

Furthermore, since the speed of the terminal device to the master unit is known, the periodicity of the closed-loop control based on the instantaneous speed can be made adaptive and this type of overhead can also be saved. In this case, the communication system knows the actual speed of the terminal device. Consequently, a slow movement reduces the frequency of estimation, since the parameters change more slowly between the estimates and are therefore current and usable for a longer period of time. This leads to a reduced signal overhead. The terminal device transmits a control message to the master unit to change the period of the closed-loop control to adjust the transmission power.

Thus, a two-step method is provided by incorporating position, movement and environment information to enable power control in the uplink of multiple access systems. This accelerates power control while simultaneously reducing the overhead at the signal processing level.

Figure 4:
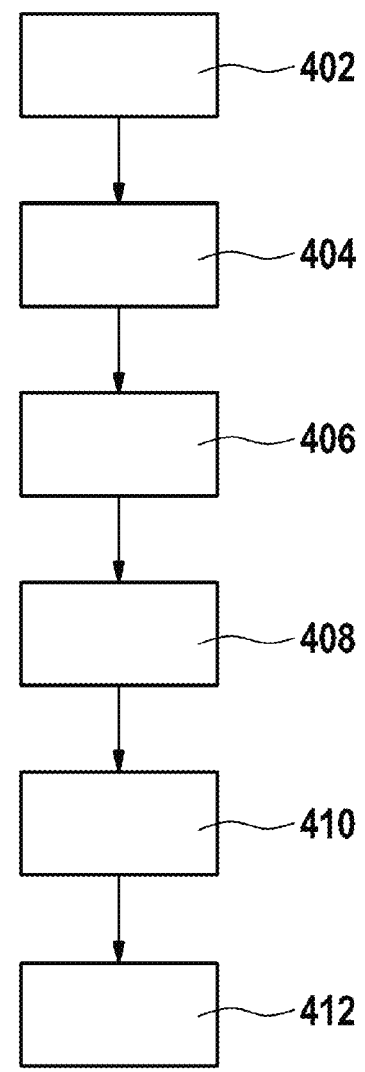
FIG. 4 shows a flow chart for setting up the industrial machine.

FIG. 4 shows a flow chart for setting up the industrial machine 100 from FIG. 1. In a step 402, the position of the at least one master unit with which the plurality of terminal devices are to communicate wirelessly is determined. In a step 404, the respective relative positions of the plurality of terminal devices to the master unit are determined. In step 404, in an example, the estimated values for the transmission power at a respective relative position to the at least one master unit are determined. A data assignment of the respective terminal device with the assigned relative position and/or with the estimated values for the transmission power is carried out in step 406.

A step 408 comprises a determination of an item of environment information between respective positions of the terminal devices and the position of the master unit. In an example, step 408 includes the determination of estimated values for the transmission power as a function of the environment information. A step 410 includes a data assignment of the respective terminal device with the environment information and/or with the estimated values for the transmission power.

Then, in step 412, the terminal devices which have been assigned data are arranged at the assigned relative position of the industrial machine.

The invention claimed is:

1. A terminal device (200; 200a; 200b) for an industrial machine (100), wherein the terminal device (200; 200a; 200b) comprises at least one communication module (C) and an antenna (A), and wherein the terminal device (200; 200a; 200b) is configured to:
   determine an initial transmission power for the terminal device (200; 200a; 200b) as a function of a previously determined relative position (POSa) of the terminal device (200; 200a; 200b) to at least one master unit (MAS), and
   transmit a radio signal (rsa) with the determined initial transmission power via an uplink radio channel (UL).

2. The terminal device (200; 200a; 200b) according to claim 1, wherein the terminal device (200; 200a; 200b) is configured to:
   determine a relative actual position (POSb) of the terminal device (200; 200a; 200b) to the at least one master unit (MAS),
   determine a further transmission power as a function of (c) the determined relative actual position (POSb) of the terminal device (200; 200a; 200b) to the at least one master unit (MAS), as a function of (d) a previously determined estimated value for the transmission power at the determined relative actual position (POSb), or as a function of both (c) and (d), and
   to transmit a further radio signal (rsb) with the determined further transmission power via the uplink channel (UL).

3. The terminal device (200; 200a; 200b) according to claim 2, wherein the terminal device (200; 200a; 200b) is configured to:
   determine the further transmission power as a function of a previously determined item of environment information between the relative actual position (POSb) and the position of the master unit (MAS).

4. The terminal device (200; 200a; 200b) according to claim 3 wherein determining a transmission power of the terminal device (200; 200a; 200b) is further based on the information about the position (POSb) of the terminal device (200; 200a; 200b).

5. The terminal device (200; 200a; 200b) according to claim 3 wherein determining a transmission power of the terminal device (200; 200a; 200b) is further based on the information about the speed and direction of the terminal device (200; 200a; 200b).

6. The terminal device (200; 200a; 200b) according to claim 5 wherein determining a transmission power of the terminal device (200; 200a; 200b) is further based on the environmental information.

7. The terminal device (200; 200a; 200b) according to claim 3 wherein the environmental information is information about the influence of objects on the uplink radio channel (UL).

8. The terminal device (200; 200a; 200b) according to claim 2 further comprising a sensor configured to provide information about a position (POSb) of the terminal device (200; 200a; 200b).

9. The terminal device (200; 200a; 200b) according to claim 2 further comprising a sensor configured to provide information about a speed and a direction of a movement of the terminal device (200; 200a; 200b).

10. The terminal device (200; 200a; 200b) according to claim 1, wherein the terminal device (200; 200a; 200b) is configured to
    to receive data from a sensor (S), an actuator (A), or both the sensor (S) and the actuator (A), and
    to transmit the received data via the radio signal (rsa), a further radio signal (rsb), or both the radio signal (rsa) and the further radio signal (rsb).

11. An industrial machine (100) comprising a plurality of terminal devices (200a, 200b) according to claim 1 and the at least one master unit (MAS) with which the plurality of terminal devices (200a, 200b) communicate wirelessly.

12. A method of operating a terminal device (200; 200a; 200b) of an industrial machine (100), the method comprising:
    determining an initial transmission power for the terminal device (200; 200a; 200b) as a function of a previously determined relative position (POSa) of the terminal device (200; 200a; 200b) to at least one master unit (MAS), and
    transmitting a radio signal (rsa) with the determined initial transmission power via an uplink radio channel (UL).

13. A method of setting up the industrial machine (100) having a plurality of terminal devices (200a, 200b) where in each terminal device (200; 200a; 200b) comprises at least one communication module (C) and an antenna (A), and wherein each terminal device (200; 200a; 200b) is configured to:
    determine an initial transmission power as a function of a previously determined relative position (POSa) of the terminal device (200; 200a; 200b) to at least one master unit (MAS), and transmit a radio signal (rsa) with the determined initial transmission power via an uplink radio channel (UL), the method comprising:

determining the position of the at least one master unit (MAS) with which the plurality of terminal devices (200*a*, 200*b*) are to communicate wirelessly, determining the respective relative positions (POSa) of the plurality of terminal devices (200*a*, 200*b*) to the master unit (MAS), providing data for the respective terminal device (200*a*, 200*b*) with the assigned relative position (POSa), with the estimated values for the transmission power, and arranging the terminal devices (200*a*, 200*b*) provided with data at the assigned relative position.

14. The method according to claim 13, wherein the method further comprises:

determining an item of environment information between respective positions of the terminal devices (200*a*, 200*b*) and the position of the master unit (MAS), and providing data for the respective terminal device (200*a*, 200*b*) with the environment information, with the estimated values for the transmission power, or both.

\* \* \* \* \*